United States Patent [19]
De Haen et al.

[11] Patent Number: 5,705,667
[45] Date of Patent: Jan. 6, 1998

[54] USE OF DENDRIMERIC-TYPE MACROMOLECULES AS CATALYSTS OR COADJUVANTS IN PHASE TRANSFER CATALYSIS REACTIONS

[75] Inventors: Christoph De Haen; Luigia Gozzini; Monica Muttoni, all of Milan, Italy

[73] Assignee: Dibra S.p.A., Milan, Italy

[21] Appl. No.: 690,353

[22] Filed: Jul. 26, 1996

[30] Foreign Application Priority Data

Aug. 2, 1995 [IT] Italy ................... MI95A1701

[51] Int. Cl.$^6$ ................. C07C 331/24; C07C 43/20; C07C 43/11
[52] U.S. Cl. ................. 558/10; 568/613; 568/623; 568/624; 568/625; 568/632
[58] Field of Search .................. 558/10; 568/632, 568/613, 623, 624, 625

[56] References Cited

PUBLICATIONS

Tomalia, D.A. et al. "Starburst Dendrimers: Molecular-Level Control of Size, Shape, Surface Chemistry, Topology, and Flexibility from Atoms to Macroscopic Matter." Angew. Chem. Int. Ed. Engl. 29 (1990): 138–175, 1990.

Padias, A.B. et al. "Starburst Polyether Dendrimers." J. Org. Chem. 52 (1987): 5305–5312, 1987.

*Primary Examiner*—Micahel G. Ambrose
*Attorney, Agent, or Firm*—Nixon & Vanderhye

[57] ABSTRACT

The present invention concerns the use of dendrimeric-type branched macromolecules, comprising polyoxaalkylene chains, as catalysts or coadjuvants of phase transfer catalysis reactions.

8 Claims, No Drawings

USE OF DENDRIMERIC-TYPE MACROMOLECULES AS CATALYSTS OR COADJUVANTS IN PHASE TRANSFER CATALYSIS REACTIONS

The present invention concerns the use of dendrimeric-type branched macromolecules, comprising polyoxaalkylene chains, as catalysts or coadjuvants of phase transfer catalysis reactions.

Over the past decade, dendrimeric macromolecules (see, for example, Adv. in Dendritic Macromolecules, vol. 1, 1994, Jai Press, London; Voegtle F. et al., Angew Chem. Int. Ed., 1994, 33, 2413) have aroused considerable interest due to their characteristics that are rather different from those of the more common linear or branched polymers which, as a result of the polymerization process employed, tend to be more highly polydispersed. Dendrimers, on the other hand, are obtained by a synthetic procedure that permits progressive growth and, consequently, greater control of molecular mass, dimension and form.

Dendrimeric molecules are characterized by the presence of a central nucleus ("core") from which chains ("dendra") depart and ramify on going from the centre to the periphery. The structures obtained therefore are ordered and multi-branched with numerous functional groups on the external surface. Dendrimeric molecules have been synthesized for certain specific uses such as, for example, to act as transporters for high concentrations of material per unit of polymer. It is possible, moreover, to prepare dendrimers that are lipophilic internally and hydrophilic externally; such molecules act as micelles and, on the basis of these characteristics, could offer a greater stability. These molecules, in addition, possess a large surface area which, in combination with a high solubility in organic solvents, could make them useful as transporters of catalysts, the advantage being that at the end of the reaction they can easily be recovered by simple extraction or filtration.

Dendrimers can have many other uses, for example, as "carriers" of chemical substances for agriculture, as adhesives, absorbents, oil/water emulsifiers, thickeners for plastic materials, standards for calibration of ultrafiltration membranes, standards for steric exclusion chromatography, calibration standards for electron microscopy, agents to modify the rheological properties of dyes and paints. The possibility of using these molecules directly as reaction catalysts, and not just as carriers of the same, has not been investigated however.

Unexpectedly, we have now found, and it is the object of the present invention, that the use of dendrimeric-type macromolecules containing polyoxaalkylene units such as oxaethylene —$OCH_2CH_2$— or oxapropylene —$OCH_2CH_2CH_2$— in their structure (which, for example, were described in international patent application WO 95/25763), as catalysts of phase transfer catalysis reactions (for a general compendium on reactions under phase transfer catalysis conditions: W. E. Keller, Fluka compendium of phase transfer reactions, vol. 3, 1992), gives results that at least are as good as, when not better than, those obtained when linear polyethylene glycol (PEG) is used (Balasubramanian, D., Sukamar, P., Chandani, B., Tetrahedron Letters, 979, 37, 3543–3544).

Such a result is even more surprising in view of the fact that analogous experiments performed with other well known dendrimers like those described by Tomalia (Tomalia, D. A., et al., Angew. Chem. Int. Ed., 1990, 29 138–175 and Padias et al. A. B. et al., J. Org. Chem., 1987, 52, 5305–5312) as catalysts of phase transfer catalysis reactions, did not permit recovery of any definite products, but only of by-products (see experimental section).

Dendrimeric molecules that can be used as catalysts or coadjuvants in phase transfer catalysis reactions can be represented by the following general formula (I):

$$A[G_{1 \to p}]_r \qquad (I)$$

where:

A is a central nucleus, or "core", deriving from a polyvalent organic residue which can be an aliphatic open chain, branched or not, residue, or an alicyclic, or a heterocyclic residue containing N, O and/or S, or an aromatic or a heteroaromatic residue and which is characterized by the presence of r terminal residues to which the polyoxaalkylene chains of the first generation are attached, r is an integer from 2 to 10 representing the multiplicity of the "core" A, $G_{1 \to p}$ represents the branched structure of the macromolecule comprising p levels of generations g, from the first one ($g_1$) to the last one ($g_p$), in which the total p number of said generations can range from 1 to 20 and in which the different generations can be the same or different and in which:

a) every generation g but the last one comprises a number of repetition units, which are represented by residues of formula

-B-M- where:

B is preferably a polyoxaethylene or polyoxapropylene chain of formula:

$$+O-(CH_2\overline{)_{0-1}}CH_2-CH_2+_n$$

in which n can range from 0 to 25 and is different or not from generation to generation, with the proviso that, in at least one of the generations of the macromolecule, n is different from 0, M represents a branching point which derives from a polyvalent aliphatic residue comprising:
 a single functional group such as OH, $NH_2$, SH, COOH, or a derivative thereof, able to link with the terminal group of chain B,
 m reactive residues for the linking of the polyoxaalkylene chains of the next generation, being m an integer ranging from 2 to 5, representing the branching multiplicity introduced by M and being m different or not from generation to generation;

b) the last generation $g_p$ comprises residues of formula:

$$-B_p-M_p[T]_{m_p}$$

where $B_p$, $M_p$, $m_p$ are defined analogously to B, M, and m, with the difference that all the $m_p$ reactive residues of $M_p$ are connected to groups T in which T is a terminal group that can be either a hydrogen atom, an alkyl group ($C_1$–$C_3$) or a hydroxy residue and being such terminal group free and either dissociated or undissociated, or protected by suitable protective groups such as pyranyl groups, ketal groups, acetyl groups, cyclic orthoester group etc.

$M_p$ can also be a single bond, in which case $m_p$ is equal to 1 (i.e., there is no branching) and as a consequence the last generation $g_p$ comprises residues of formula:

$-B_p-T$ where $B_p$ and T are as above defined; further c) in case p=1, that is when the macromolecule contains only one generation, $g_p$ corresponds to $g_1$, i.e. represents the residue:

$$-B_1-M_1[T]_{m_1}$$

where $B_1$, $M_1$, $m_1$ and T are defined analogously to $B_p$, $M_p$, $m_p$ and T.

As a consequence, in this case the macromolecule is represented by the following formula $A[g_1]_r$, i.e.

$$A[B_1-M_1[T]_{m_1}]_r$$

in which A, $B_1$, $M_1$, T, $m_1$ and r are defined as above.

A schematic representation of the structure of macromolecules of the present invention is developed sequentially according to the following series of formulae:

$$A[G_{1 \to p}]_r \quad (I)$$

in which:

$G_{1 \to p}$ represents $B_{1-M_1}[G_{2 \to p}]_{m_1}$, where $B_1-M_1$ corresponds to $g_1$ and $G_{2 \to p}$ represents $B_2-M_2[G_{3 \to p}]_{m_2}$, where $B_2-M_2$ corresponds to $g_2$ etc.

and so on until the last generation is reached in which:

$G_p$ represents $B_p-M_p[T]_{m_p}$, where the symbols used have been defined previously.

The afore-mentioned development can be illustrated in a more complete form by the following expanded general formula (II)

$$A[B_1-M_1[B_2-M_2[\to\to\to[B_p-M_p[T]_{m_p}]\to\to\to]_{m_2r_1}]_r \quad (II)$$

Compounds of the present invention which are particularly preferred are those in which r varies from 2 to 6, preferably from 2 to 4 and in which the "core" A is a neopentyl residue with the formula $$C(CH_2)_{4}-$$

Equally preferred are those compounds in which B is a polyoxaethylene chain of formula $$+O-CH_2-CH_2+_n$$

in which n is an integer between 0 and 25, preferably between 0 and 15.

Also preferred are compounds in which M is a bi- or trifunctional branching point represented by a residue of formula:

$$-O-(CH_2)_q-CH\begin{matrix}CH_2-\\CH_2-\end{matrix} \quad \text{or} \quad -O-(CH_2)_q-C\begin{matrix}CH_2-\\CH_2-\\CH_2-\end{matrix}$$

in which q is an integer between 0 and 4 and preferably between 0 and 2.

Equally preferred are macromolecular compounds in which the generations are from 1 to 20 and preferably from 1 to 15.

One of the classes of compounds preferred as catalysts or coadjuvants for phase transfer reactions has the following general formula (III)

$$C\left[CH_2 \frac{|}{|}(OCH_2CH_2)_n O(CH_2)_{g'_1-1}C[H]_{0-1}[CH_2 \frac{|}{|}L]_{2-3}\right]_4 \quad (III)$$

in which:

n is a integer from 0 to 20 and preferably from 0 to 15, $g'_1$ is the first generation having a branching multiplicity of either 2 or 3

L represents T, or the sequence of successive generations from $g'_2$ to $g'_p$ in which each g', apart from $g'_1$, is defined analogously to $g'_1$ and can have the same meaning or not whereas $g'_p$ corresponds to $g'_1$-T and p can be as high as 20 but preferably 15 and T is defined as before and with the proviso that n is different from 0 in at least one generation.

The use of the above-mentioned dendrimeric molecules as catalysts in phase transfer catalysis reactions can be achieved by employing said molecules either as solvents or even in catalytic amounts (10–40% in moles with respect to the initial product, preferably 10–30%).

Furthermore, an effect that can be defined more properly as coadjuvant has surprisingly been found for dendrimeric molecules of the present invention; an increased yield for classical phase transfer catalysis reactions can be obtained when dendrimeric molecules, in amounts that are greater than 10% of the starting material, are present concomitantly with catalysts such as quaternary ammonium salts.

Another advantage arising from the use of dendrimeric macromolecules of the present invention as catalysts or coadjuvants of reactions is that they can be separated conveniently at the end of the reaction by simple filtration or ultrafiltration through membranes of suitable porosity, by a process which is therefore economically and ecologically advantageous and which allows the recovery of a final product free of any trace amounts of catalyst.

In the following experimental section the results of studies with dendrimeric macromolecules containing polyoxaethylene chains, PEG's and Tomalia's dendrimeric macromolecules are compared in nucleophilic substitution reactions, particularly in the formation of a phenolic ether and in the conversion of benzyl chloride into benzyl thiocyanate.

The products used as solvents and/or catalysts have the following formulae:

AI polyethylene glycol 400 (PEG 400) $HO(C_2H_4O)_4H$

AII polyethylene glycol 1500 (PEG 1500) $HO(C_2H_4O)_nH$

AIII 3,6,10,13-tetraoxa-8,8-bis-(2,5-dioxa-7-hydroxyheptyl)pentadecane-1,15-diol ($C_{21}H_{44}O_{12}$) $C(CH_2OCH_2CH_2OCH_2CH_2OH)_4$ AIV 18,18-bis[10,10-bis(2,5-dioxa-7-hydroxyheptyl)-2,5,8,12,15-pentaoxa-17-hydroxyheptadecyl]-8,8,28,28-tetra(2,5-dioxa-7-hydroxyheptyl)-3,6,10,13,16,20,23,26,30,33-decaoxapenta-triacontane- 1,35-diol ($C_{89}H_{180}O_{48}$) $C[CH_2OCH_2CH_2OCH_2CH_2OCH_2C(CH_2OCH_2CH_2OCH_2CH_2OH)_3]_4$ AV 4,8-dioxa-2,2,10,10-tetra(hydroxymethyl)-6,6-bis[2-oxa-4,4-bis(hydroxymethyl)-5-hydroxymethyl]-undecane-1,11-diol (Tomalia compound) $C[CH_2OCH_2C(CH_2OH)_3]_4$ Products AI and AII were commercially available, AIII and AIV were obtained as described in patent application WO 95/25763 (Examples 3 and 12), AV was synthesized according to Padias et al. (J. Org. Chem. 52, 5305–5312, 1987).

The following examples illustrate the preferred experimental conditions for carrying out the process, object of the invention.

EXAMPLE 1

Alkylation reaction of β-naphthol with benzyl chloride using the test molecules both as solvent and as catalyst for phase transfer catalysis reaction.

β-naphthol (0.001 mol) is dissolved with magnetic stirring in the desired polyoxaethylene alcohol (0.0015 mol) (AI, AIII, AIV). Once dissolved, KOH (0.0025 mol) in $H_2O$ (0.1 ml) and then benzyl chloride (0.002 mol) are added. After stirring at room temperature for 2 hours, the mixture is diluted with water (10 ml) and extracted with ethyl acetate (3×10 ml). The organic layers are combined, dried over $Na_2SO_4$, filtered and evaporated to dryness. The crude reaction product is chromatographed on a column of silica gel, using a mixture of n-hexane/ethyl acetate (85/15) as eluent.

The reaction yields, approximately 80%, are comparable for each of the compounds tested (AI, AIII, AIV). The $^1$H-NMR, $^{13}$C-NMR and Mass spectra of the products agree with the proposed structure. The reaction conditions are given in Table I.

TABLE I

| Experiment | Solvent and catalyst | % in moles of catalyst | Yield % |
|---|---|---|---|
| 1 | AI | 150 | 78 |
| 2 | AIII | 150 | 78 |
| 3 | AIV | 150 | 82 |

EXAMPLE 2

Alkylation reaction of β-naphthol with benzyl chloride using the test molecules as catalyst for phase transfer catalysis reaction.

The alkylation reaction of β-naphthol described in Example 1 has been conducted with compounds AI, AIII and AIV as catalysts only and not as solvents. Toluene and $CH_2Cl_2$ were instead used as reaction solvents.

Tomalia's first generation compound AV was also tested under these conditions but failed to catalyse the formation of any alkylation products. The results are given in Table II. Experiments performed in the absence of AI, AIII and AIV similarly gave only by-products.

TABLE II

| Experiment | Solvent and catalyst | % in moles of catalyst | Catalyst | Yield % |
|---|---|---|---|---|
| 1 | $CH_2Cl_2$ | — | — | only by-products |
| 2 | Toluene | — | — | only by-products |
| 3 | $CH_2Cl_2$ | 40 | AI | 75 |
| 4 | Toluene | 40 | AI | 75 |
| 5 | $CH_2Cl_2$ | 40 | AIII | 75 |
| 6 | Toluene | 40 | AIII | 75 |
| 7 | $CH_2Cl_2$ | 40 | AIV | 75 |
| 8 | Toluene | 40 | AIV | 75 |
| 9 | $CH_2Cl_2$ | 40 | AV | only by-products |
| 10 | Toluene | 40 | AV | only by-products |

Analogous results were obtained when amounts of catalyst ranging from 5% to 20% were used.

EXAMPLE 3

Synthesis of benzyl thiocyanate using the test molecules as catalyst of phase transfer catalysis reaction Benzyl chloride (0.05 mol) is dissolved in $CHCl_3$ (20 ml) and, after adding KSCN (0.07 mol) and the desired catalyst (AII, AIII, AIV, AV) (0.02 mol), is stirred over a magnetic stirrer and refluxed (60° C.) for 2 hours. After allowing to cool, the solvent is evaporated under vacuum and the crude reaction product purified by distillation under vacuum (b.p. 150° C.; $10^{-2}$ mbar).

The $^1$H-NMR, $^{13}$C-NMR and Mass spectra of the products agree with the proposed structure. The reaction conditions are given in Table III.

TABLE III

| Experiment | catalyst | Yield % |
|---|---|---|
| 1 | — | no reaction product |
| 2 | AII | 72 |
| 3 | AIII | 75 |
| 4 | AIV | 75 |
| 5 | AV | no reaction product |

Analogous results were obtained when amounts of catalyst ranging from 5% to 20% were used.

We claim:

1. A process of carrying out a reaction that involves phase-transfer catalysis, wherein the improvement consists of using as a phase-transfer catalyst or as a coadjuvant a dendrimeric-type macromolecule of formula (I):

$$A[G_{1 \to p}]_r \quad (I)$$

in which:

A is a central nucleus, or core, derived from a polyvalent organic residue which can be an aliphatic open chain, branched or not, residue, or an alicyclic, or a heterocyclic residue containing N, 0 and/or S, or an aromatic or a heteroaromatic residue and which is characterized by the presence of r terminal residues to which the polyoxaalkylene chains of the first generation are attached, r is an integer from 2 to 10 representing the multiplicity of the core A, $G_{1 \to p}$ represents the branched structure of the macromolecule comprising p levels of generations g, from the first one ($g_1$) to the last one ($g_p$), in which the total p number of said generations ranges from 1 to 20 and in which the different generations can be the same or different and in which (a) every generation g but the last one comprises a number of repeating units, which are represented by residues of the formula:

-B-M- where:

B is a polyoxaethylene or polyoxapropylene chain of formula:

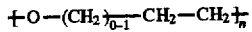

in which n ranges from 0 to 25 and may or may not be different from generation to generation, with the proviso that, in at least one of the generations of the macromolecule, n is other than 0, M represents a branching point which derived from a polyvalent aliphatic residue comprising:

a single functional group selected from OH, $NH_2$, SH, COOH, or a derivative thereof, linking to the terminal group of chain B, m reactive residues for linking the polyoxaalkylene chains of the next generation, being m an integer ranging from 2 to 5, representing the branching multiplicity introduced by M, in which m may or may not be different from generation to generation;

(b) the last generation $g_p$ comprises a residue of the formula:

where $B_p$, $M_p$, $m_p$ are defined analogously to B, M, and m, provided that all the $m_p$ reactive residues of $M_p$ are connected to groups T in which T is a terminal group that can be either a hydrogen atom, a $C_1$–$C_3$ alkyl group or a hydroxy residue and being free and either dissociated or undissociated, or protected by a protective group and in which $M_p$ can also be a single bond, in which there is no branching and $m_p$ is equal to 1 and as a consequence the last generation $g_p$ comprises a residue of formula:

where $B_p$ and T are as above defined; and further (c) when the macromolecule contains only one generation and p=1, $g_p$ corresponds to $g_1$ as represented by the residue:

where $B_1$, $M_1$, $m_1$ and T are defined analogously to $B_p$, $M_p$, $m_p$ and T.

2. A process according to claim 1 wherein the protective group is a pyranyl, ketal, acetal or cyclic or thoester group.

3. A process according to claim 1 wherein in said dendrimeric-type macromolecule the core A is a neopentyl residue of the formula

and every generation but the last one comprises residues:

in which:

B' is a polyoxaethylene residue of the formula:

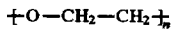

where n is variable between 0 and 15 and varies from generation to generation, provided that it is not 0 in at least one generation, M' is a branching point with a branching multiplicity of 2 or 3, and a formula:

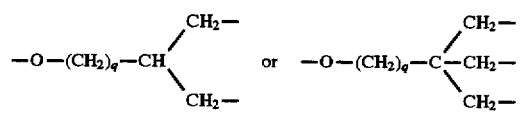

where q is an integer variable between 0 and 4; and the final generation comprises residues of the formula:

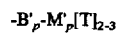

in which $B'_p$ and $M'_p$ are defined analogously to B', M' and T, or alternatively, $M_p'$ is a single bond and the final generation comprises residues of the formula:

in which the total number of generations can vary between 1 and 15.

4. A process according to claim 2 wherein said dendrimeric-type macromolecule has formula:

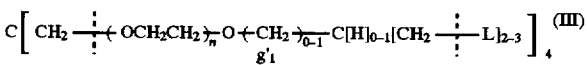

in which:

n is an integer from 0 to 20;

$g'_1$ is the first generation having a branching multiplicity of either 2 or 3, L represents T, or the sequence of successive generations from $g'_2$ to $g'_p$ in which each $g'_i$, apart from $g'_1$, is defined analogously to g', or $g'_p$ corresponds to $g'_1$-T and p can be as high with the proviso that n is not 0 in at least one generation.

5. A process according to claim 4 wherein p is at most 15.

6. A process according to claim 1 wherein at least one compound of formula I is used as the reaction solvent.

7. A process according to claim 1 wherein at least one compound of formula I is used as phase-transfer catalyst in molar quantities of from 1 to 40% relative to the starting product of the process that involves phase-transfer catalysis.

8. The process according to claim 7 wherein the amount of catalyst is 10 to 30%.

* * * * *